(12) United States Patent
Pike et al.

(10) Patent No.: US 7,609,707 B2
(45) Date of Patent: Oct. 27, 2009

(54) COMMUNICATION TRAFFIC MANAGEMENT SYSTEMS AND METHODS

(75) Inventors: Dion Pike, Stittsville (CA); Mike Noll, San Jose, CA (US); Mark Alexander Leith Smallwood, Beaconsfield (GB)

(73) Assignee: Alcatel Lucent, Paris (FR)

( * ) Notice: Subject to any disclaimer, the term of this patent is extended or adjusted under 35 U.S.C. 154(b) by 644 days.

(21) Appl. No.: 11/216,913

(22) Filed: Aug. 31, 2005

(65) Prior Publication Data

US 2007/0058541 A1    Mar. 15, 2007

(51) Int. Cl.
*H04L 12/56* (2006.01)
(52) U.S. Cl. .................... 370/412; 370/390
(58) Field of Classification Search ........... 370/216, 370/254, 242, 244, 412, 413, 218–220
See application file for complete search history.

(56) References Cited

U.S. PATENT DOCUMENTS

| | | | |
|---|---|---|---|
| 6,292,492 B1 | 9/2001 | Bonomi et al. | |
| 6,993,024 B1 * | 1/2006 | McDermott et al. | 370/390 |
| 7,046,665 B1 * | 5/2006 | Walrand et al. | 370/392 |
| 7,289,513 B1 * | 10/2007 | Medved et al. | 370/395.31 |
| 2003/0058793 A1 * | 3/2003 | Rochon et al. | 370/229 |
| 2004/0105388 A1 | 6/2004 | Wilkins et al. | |
| 2005/0169447 A1 | 8/2005 | Wong | |

FOREIGN PATENT DOCUMENTS

WO    WO 98/27697    6/1998

* cited by examiner

*Primary Examiner*—Kwang B Yao
*Assistant Examiner*—Alex Skripnikov
(74) *Attorney, Agent, or Firm*—Smart & Biggar (57) ABSTRACT

Communication traffic management systems and methods are disclosed. One or more traffic managers may be provided for managing communication traffic to be sent toward respective groups of one or more destinations. A determination is made as to whether one traffic manager or more than one traffic manager is provided. If one traffic manager is provided, then communication traffic is transferred to the traffic manager. In the case where more than one traffic manager is provided, received communication traffic is transferred to a traffic manager for a destination toward which the communication traffic is to be sent. Traffic managers may be added to or removed from communication equipment to provide varying levels of traffic management.

14 Claims, 3 Drawing Sheets

COMMUNICATION TRAFFIC MANAGEMENT SYSTEMS AND METHODS

FIELD OF THE INVENTION

This invention relates generally to communications and, in particular, to managing communication traffic.

BACKGROUND

Current communication traffic management schemes which are applied to communication traffic typically have a centralized queuing point, in an egress data path in communication equipment for instance, from which traffic is scheduled. This results in several fundamental problems.

Cost is one disadvantage of current traffic management schemes. A designer must generally determine the "scale" of traffic management requirements ahead of time and pay for this up front, to implement a depth of memory sufficient to support the determined traffic management requirements. A significant negative impact of this cost is that many potential entrants into the communications industry, especially relatively small businesses, are not able to satisfy the cost of entry market demands of a new product while still being able to meet traffic management requirements.

Flexibility is another traffic management challenge. Traffic management is normally scaled to fit unique customer applications by implementing a certain number of queuing entities, depth of memory, number of virtual output ports, etc. Traffic management capabilities cannot be expanded to meet growing needs or requirements once communication equipment is deployed.

There remains a need for improved communication traffic management systems and methods.

SUMMARY OF THE INVENTION

According to one aspect of the invention, there is provided a device comprising an output to be operatively coupled to one or more traffic managers, each traffic manager for managing communication traffic to be sent toward one or more destinations, a detector operatively coupled to the output and configured to determine whether one or more than one traffic manager is operatively coupled to the output, and a controller, operatively coupled to the output. The controller is configured to transfer communication traffic to the traffic manager where one traffic manager is operatively coupled to the output, and further configurable to determine a destination of received communication traffic and to transfer the received communication traffic to a traffic manager for the determined destination where more than one traffic manager is detected by the detector.

Where the communication traffic comprises blocks, with each block having a header and an information portion, and the controller may determine the destination of the received communication traffic by accessing the header of each block of the received communication traffic.

Each traffic manager may include a plurality of queues. In this case, the controller may be configured to transfer the received communication traffic to a traffic manager by selecting a queue of the plurality of queues and transferring the communication traffic to the selected queue. The plurality of queues may include one or more hardware-backpressurable queues.

In one embodiment, the controller comprises a communication traffic processor configured to determine the destination of the communication traffic and to insert an identifier of the traffic manager for the destination into the communication traffic, and a traffic transfer module operatively coupled to the traffic processor and to the output and configured to transfer the communication traffic to the traffic manager for the determined destination.

Each traffic manager may perform at least one traffic management function selected from the group consisting of: traffic scheduling and traffic shaping.

The device may implemented, for example, in communication equipment. The communication equipment may further include a plurality of traffic managers operatively coupled to the output, and a plurality of ports for operative coupling to a communication medium. Where each traffic manager comprises a plurality of queues for storing communication traffic to be sent through one or more ports of the plurality of ports, the controller may be configured to transfer the received communication traffic to a traffic manager by determining a port of the plurality of ports through which the traffic is to be sent and a queue of the plurality of queues for storing traffic for the determined port, and transferring the received communication traffic to the determined queue.

The ports may be ports provided on a plurality of electronic circuit cards, at least one of the plurality of electronic circuit cards comprising a traffic manager of the plurality of traffic managers.

An electronic circuit card, for use with communication equipment that comprises a traffic manager, may itself comprise an additional traffic manager. The traffic manager of the electronic circuit card is operable to receive communication traffic from the controller of the communication equipment when the electronic circuit card is operatively coupled to the communication equipment.

A method is also provided, and involves receiving communication traffic, determining a destination of the received communication traffic, transferring the received communication traffic to a traffic manager for managing communication traffic to be sent toward the determined destination, the traffic manager being one of a group of one or more available traffic managers, detecting a change in the group of available traffic managers, and transferring subsequently received communication traffic to a traffic manager of the changed group.

The operation of detecting may involve at least one of: detecting that an additional traffic manager has become available and detecting that a traffic manager of the group has become unavailable.

When the method is implemented in communication equipment adapted for operation with electronic circuit cards, the detecting may involve at least one of: detecting that an electronic circuit card comprising a traffic manager has been connected to the communication equipment and detecting that an electronic circuit card comprising a traffic manager has been disconnected from the communication equipment.

Each traffic manager of the group may comprise a plurality of queues, each queue for storing communication traffic to be sent toward a respective destination. In this case, the method may further involve maintaining a list of queues of available traffic managers, and determining a destination may involve accessing the list to determine a queue of the plurality of queues for storing communication traffic to be sent toward the determined destination. The transferring operations may then involve transferring communication traffic to the determined queue.

In some embodiments, determining a destination further involves inserting into the received communication traffic an identifier of the determined queue.

The method may also involve reconfiguring a component of communication equipment, responsive to the detecting, to transfer subsequently received communication traffic to a traffic manager of the changed group.

According to another aspect of the present invention, there is provided a device which comprises an output for operative coupling to one or more traffic managers, each traffic manager for managing communication traffic to be sent to a respective group of communication medium interfaces, and a controller, operatively coupled to the output, configured to determine whether a common communication traffic management function is to be performed for received communication traffic, and, where the common communication traffic management function is to be performed for the received communication traffic, to forward the received communication traffic to a predetermined traffic manager regardless of the communication medium interface to which the communication traffic is to be forwarded, the predetermined traffic manager being operatively coupled to the output and configured to perform the common communication traffic management function.

The common function may include at least one of mirroring and multicasting.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
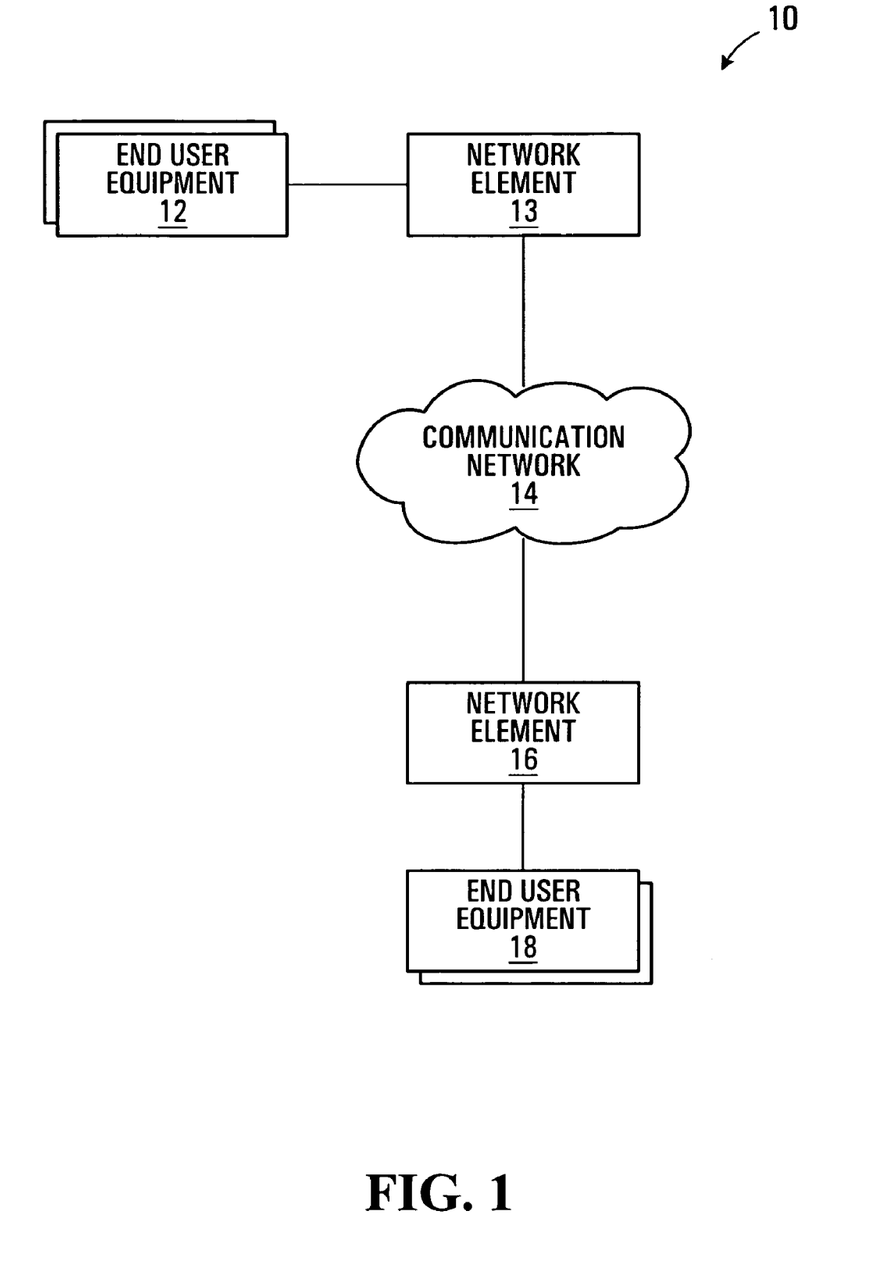
FIG. 1 is a block diagram of a communication system.

FIG. 1 is a block diagram of a communication system 10, in which some embodiments of the invention may be implemented. The communication system 10 includes end user communication equipment 12, 18, network elements 13, 16, and a communication network 14. Although many installations of end user equipment 12, 18 and network elements 13, 16 may be connected to the communication network 14, only two examples of each of these components have been labelled in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The end user equipment 12, 18 represents communication equipment which is configured to generate and transmit and/or receive and terminate communication traffic. Although shown as being directly connected to the network elements 13, 16, it will be apparent that end user equipment 12, 18 may communicate with the network elements 13, 16 through other intermediate components (not shown).

Switches and routers are illustrative of the types of communication equipment represented by the network elements 13, 16. The network elements 13, 16 provide access to the communication network 14 and thus have been shown separately in FIG. 1 for illustrative purposes.

The communication network 14, in addition to the border or edge network elements 13, 16, may also include intermediate network elements which route communication traffic through the communication network 14. It should be noted that, in some embodiments, the network 14 could, itself, consist of the network elements 13, 16. The network elements 13, 16 may thus be edge, core, or other types of communication equipment.

Many different types of end user, intermediate, and network communication equipment, as well as the operation thereof, will be apparent to those skilled in the art. In general, communication traffic originating with end user equipment 12, 18, and possibly other sources of communication traffic, for transfer to a remote destination through the communication network 14 is received by a network element 13, 16, translated between different protocols or formats if necessary, and routed through the communication network 14. In a particular example embodiment, the network elements 13, 16 exchange traffic with the end user communication equipment 12, 18 over Asynchronous Transfer Mode (ATM) or Synchronous Optical Network (SONET), using Packet over SONET (POS) mechanisms for instance, whereas the communication network 14 is an IP or MPLS network. However, it should be appreciated that embodiments of the invention are not limited to any particular types of communication equipment, transfer mechanisms, or protocols.

One common type of installation for communication network equipment such as the network elements 13, 16 includes an equipment rack having multiple slots. The communication equipment may include hardware for supporting communications with the communication network 14 and performing general processing of communication traffic. Electronic circuit cards such as line cards are then used in one or more slots to provide a medium- or protocol-specific interface. Using this kind of architecture, it tends to be easier to maintain spares for medium-specific modules in case of equipment failure, and substantially the same hardware core may be used in conjunction with various medium-specific modules.

For example, traffic management functions such as queuing and scheduling, as well as other communication traffic switching and processing functions, may be provided in the hardware core, and interfaces to a communication medium are provided in electronic circuit cards installed in one or more slots. The hardware core implements a preferred scale of traffic management for all communication traffic to be sent through the communication medium interfaces.

As noted above, such communication traffic management schemes may have disadvantages in terms of cost and flexibility.

U.S. patent application Ser. No. 10/770,429, entitled "PAY-PER-USE COMMUNICATION NODE CAPABILITIES", filed on Feb. 4 2004, published on Aug. 4, 2005 under Publication No. 2005/0169447 and assigned to the assignee of the present application, discloses a system and method for enabling additional capacity or features on telecommunication nodes without requiring replacement of hardware. Embodiments of that system and method involve enabling additional capacity or features using a security key and then billing for the additional capacity or features.

According to an aspect of the present invention, however, communication equipment is adapted to operate with any of several different hardware implementations. A customer may deploy communication equipment that supports a certain base level of traffic management, and later purchase and deploy additional hardware, in the form of electronic circuit cards for example, when additional capacity is required.

Thus, embodiments of the present invention allow communication equipment to be supplemented with additional hardware as requirements change.

With state of the art traffic management systems, especially for egress (customer-facing traffic flow) in many routers and switches, the cost of traffic management circuitry becomes a "barrier to entry". Equipment with expandable traffic management capabilities, according to embodiments of the invention, allows a traffic management feature to grow, for example, as the density of a particular router grows and as it is applied to specific customer applications. This provides a "pay as you grow" aspect to traffic management. Network operators and service providers can maintain a level of a traffic management feature while scaling a particular router and network in the most cost effective manner.

Figure 2:
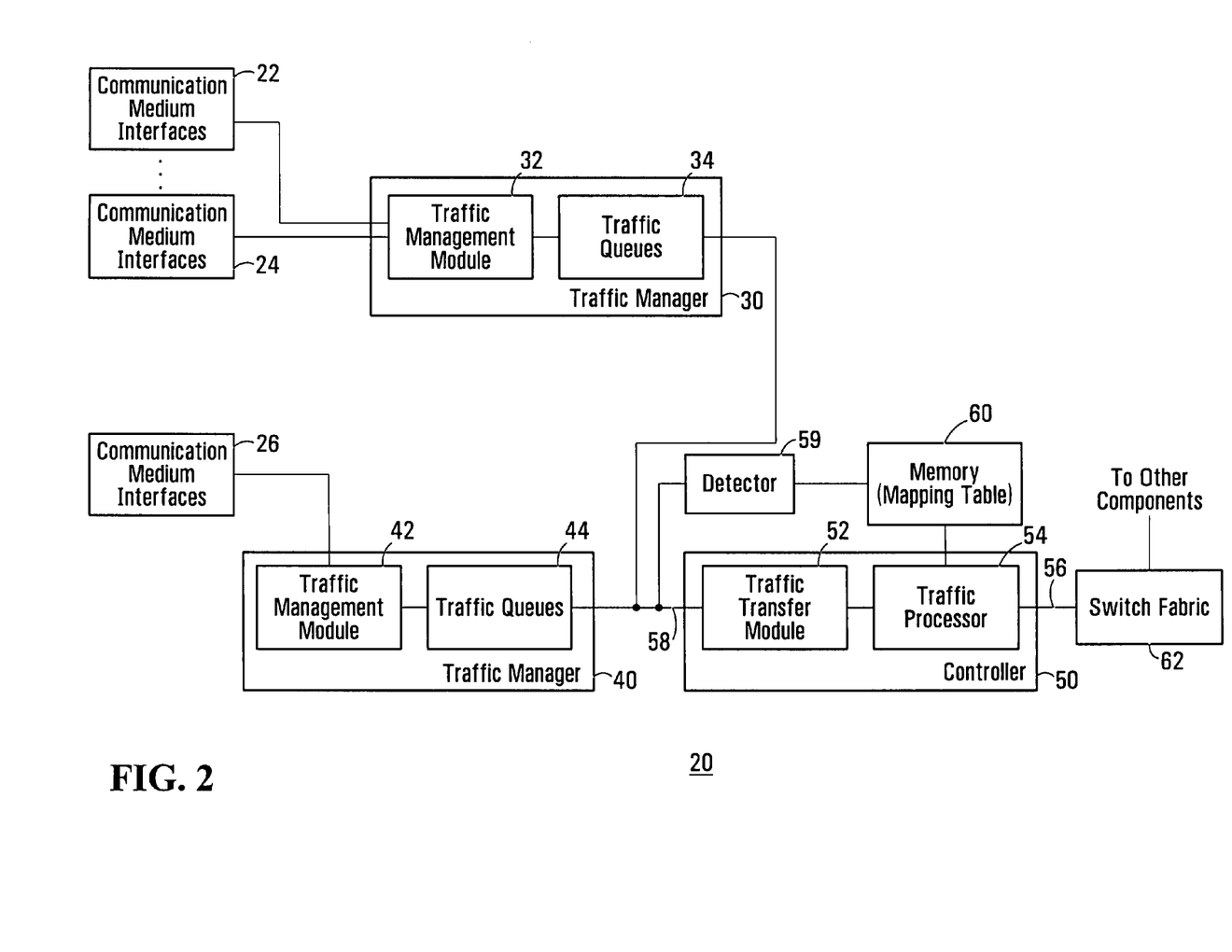
FIG. 2 is a block diagram of communication equipment.

FIG. 2 is a block diagram of communication equipment. The equipment shown in FIG. 2 may be implemented in a network element such as the network elements 13, 16 of FIG. 1, for example.

The equipment 20 includes communication medium interfaces 22, 24, 26, traffic managers 30, 40 operatively coupled to the interfaces, a controller 50 having an output 58 operatively coupled to the traffic managers, a detector 59, and a memory 60 operatively coupled to each other and to the controller 50, and switch fabric 62 operatively coupled to an input 56 of the controller. The traffic managers 30, 40 include traffic management modules 32, 42 and traffic queues 34, 44, and the controller 50 includes a traffic transfer module 52 and a traffic processor 54.

It should be appreciated that the particular structure shown in FIG. 2 is intended solely for the purposes of illustration, and not to limit the invention.

For example, communication equipment in which an embodiment of the invention is implemented may include more or fewer communication medium interfaces than specifically shown. The component(s) through which a controller receives communication traffic may also vary depending upon the type and structure of communication equipment with which an embodiment of the invention is to operate.

The particular components and the operative connections therebetween as shown in FIG. 2 are also illustrative. The components 52, 54, 59, 60 represent an example of one possible implementation of the traffic manager detection functionality, which is described in further detail below. In other embodiments,. the detector 59 may be directly operatively coupled to the traffic processor 54, or the traffic transfer module 52 may itself be operatively coupled to the memory 60 and/or to the detector 59 so as to determine to which traffic manager received communication traffic should be sent. Further variations of these and other operative couplings and arrangements of components are also contemplated.

The types of connections through which the components of FIG. 2 are operatively coupled may, to at least some extent, be implementation-dependent. Communication equipment components often use various types of physical connectors and wired connections such as midplane and backplane conductors, although the present invention is in no way limited to wired connections. In the case of cooperating software functions, for example, an operative coupling may be through variables or registers, and thus moreso a logical coupling than a physical coupling.

The communication medium interfaces 22, 24, 26 provide one or more interfaces to a communication medium. These may include such components as communication ports for connection to physical communication lines and associated output modules which enable communication traffic to be sent toward respective destinations. In one embodiment, the communication medium interfaces 22, 24 are implemented as line cards. As described in further detail below, the communication medium interfaces 26 may also be provided on an electronic circuit card, although in one embodiment the traffic manager 40 is provided on the same circuit card as the communication medium interfaces 26.

Each traffic manager 30, 40 may be implemented using hardware, software for execution by a processing component such as a microprocessor, a microcontroller, a programmable logic device (PLD), a Field Programmable Gate Array (FPGA), an Application Specific Integrated Circuit (ASIC), or other type of "intelligent" integrated circuit, or some combination of hardware and software. According to one particular embodiment, each traffic management module 32, 42 is implemented in an ASIC, and the traffic queues 34, 44 are implemented in memory devices. The memory devices may be solid state memory devices or memory devices for use with movable or even removable storage media.

The controller 50 may similarly be implemented using hardware, software, or some combination thereof. For example, the traffic processor 54 may include one or more hardware components configured by software to perform packet processing operations such as control and forwarding operations described in further detail below, and the traffic transfer module 52 is an FPGA which is also configured by software to perform other functions.

The memory 60 represents a memory device, which may be a solid state or other type of memory device, in which data used in controlling the transfer of communication traffic within the equipment 20 is stored. As shown, this data may be in the form of a mapping table. Such a mapping table may map communication traffic destinations to particular interfaces 22, 24, 26, and/or to queues 34, 44 for storing communication traffic to be sent from the equipment 20 on those interfaces, for instance. Although shown as a single component which is operatively coupled to both the detector 59 and the traffic processor 54, the memory 60 may include multiple physical memory devices or distinct memory areas storing separate memory tables between which mapping information is exchanged, for example.

Information in the memory 60 is maintained by the detector 59, which, like other components, may be implemented in hardware, software, or a combination thereof. The detector 59 detects any changes in the group of traffic managers operatively coupled to the output 58 of the controller 50, and updates the memory 60 accordingly. It will be appreciated that this detection function of the detector 59 may involve the control plane of the communication equipment 20, and thus the detector 58 may be provided as, or operatively coupled to, an equipment control system such as a control card (not shown).

As noted above, the switch fabric 62 is one illustrative example of a component from which the controller 50 may receive communication traffic. The switch fabric 62 may be operatively coupled to other components, such as other line cards or network interface cards, and switch communication traffic which is to be sent through any of the interfaces 22, 24, 26 to the controller 50. In one embodiment, the communication medium interfaces 22, 24, 26 may be used to both receive and send communication traffic, and be connected through an ingress data path (not shown) to the switch fabric 62. Communication traffic that is received through an interface of the communication medium interfaces 22, 24, 26 and is to be sent out through a different interface is switched to the controller 50, which in this case is part of an egress data path, by the switch fabric 62.

In operation, the controller 50 steers communication traffic to either the traffic manager 30 or the traffic manager 40, depending on its destination. The traffic managers 30, 40 perform traffic management functions such as scheduling and/or shaping for communication traffic to be sent through respective groups of one or more interfaces, shown in FIG. 2 as the interfaces 22, 24, 26.

However, the controller 50 is configurable to operate in conjunction with one or multiple traffic managers. Traffic managers may thus be added to, or removed from, the communication equipment 20, and operation of the controller 50 is adapted accordingly.

This adaptive capability of the controller 50 allows a network owner/operator or service provider to implement communication equipment 20 with an initial desired or required level of traffic management, such as by building the controller 50 and the traffic manager 30 into the hardware core of the communication equipment 20. The traffic manager 30 may be able to provide traffic management for a certain number of ports provided on line cards installed in the equipment 20, for example. Line cards may then be added to slots in a communication equipment rack to expand the number of available interfaces as communication traffic levels and/or service commitments change. In one possible implementation, the traffic queues 34 may provide a certain number of virtual output queues from which communication traffic can be scheduled to the interfaces 22, 24 by the traffic management module 32.

In the event that a higher port density is required, then the traffic queuing and management capabilities of the traffic manager 30 may be insufficient. Although the equipment 20 could have been designed to accommodate forecast customer growth in addition to initial requirements, this may significantly increase startup costs to such a degree as to prevent smaller companies from entering the communications market at all.

Embodiments of the invention allow additional traffic management capacity to be subsequently purchased and added to the communication equipment 20. An electronic circuit card on which the communication medium interfaces 26 and the traffic manager 40 are implemented represents one example of a manner in which additional traffic management capacity could be purchased and added. In this case, instead of purchasing and deploying hardware required to meet both current needs and future growth, a network operator or service provider can purchase only basic equipment to meet immediate or near-term forecasted needs, add line cards until available capabilities are fully utilized, and thereafter purchase and install additional electronic circuit cards having their own traffic managers, as needed. This may drastically reduce initial capital outlay, while in no way limiting future growth.

In view of the foregoing, it should be apparent that the output 58 of the controller 50 may be operatively coupled to one or more traffic managers 30, 40. According to one embodiment, the equipment 20 initially includes only one traffic manager 30, and the controller 50 transfers communication traffic received through its input 56 to the traffic manager 30. In performing this function, the traffic processor 54 may determine the destination of received communication traffic, which may be a port identifier for instance, and consults a mapping table in the memory 60 to identify one of the traffic queues 34 which stores traffic for the destination. Multiple queues may be used for any destination or port, to store communication traffic of different types or communication traffic having different characteristics or priorities, for example. The traffic management module 32 then sends the queued communication traffic to the correct interface 22, 24.

In some embodiments, a scheduling and/or shaping algorithm specifies how queued traffic is handled by the traffic management module 32.

In accordance with an embodiment of the invention, the controller 50 is further configured to transfer received communication traffic to one of multiple traffic managers 30, 40 based on the determined destination when more than one traffic manager is operatively coupled to its output. For example, when an electronic circuit card including the traffic manager 40 is installed in the communication equipment 20, additional traffic queues 44 become available to store communication traffic to be sent toward destinations to which routes have been established through the interfaces 26. The actual establishment of routes through interfaces of the communication equipment 20 is beyond the scope of the present patent application, and the present invention is in no way limited to any particular routing scheme. Those skilled in the art will be familiar with many different ways in which traffic routing tasks may be accomplished. The traffic management techniques disclosed herein may also be compatible with new routing schemes which are subsequently developed.

Use of the additional traffic queues 44 may be enabled by adding the queues to a mapping table stored in the memory 60. The detector 59 detects the installation of the traffic manager 40 and adds identifiers of the traffic queues 44 to the mapping table in the memory 60. Manual updating of the memory 60, through a remote network management system (NMS) or a local or remote operator terminal for instance, is also contemplated.

The traffic processor 54 may determine the destination of received communication traffic in any of various ways. If the communication traffic is in the form of blocks such as packets, each block may include a header and an information portion, with the header specifying the destination and possibly other traffic characteristics which are relevant to transfer of the traffic within the equipment 20. As noted above, the traffic processor 54 may identify a particular traffic queue to which received communication traffic is to be transferred based not only on destination, but also on priority and/or other characteristics, by accessing the memory 60.

In the controller 50, the traffic processor 54 decides where received communication traffic is to be transferred, and the traffic transfer module 52 actually transfers the communication traffic. According to one embodiment, the traffic processor 54 inserts into the communication traffic an identifier of the specific traffic manager for the determined destination, and the traffic transfer module 52 transfers the communication traffic to that traffic manager.

Although the identifier could be appended or otherwise added to communication traffic, the identifier need not necessarily increase an amount of information which might otherwise be forwarded from the traffic processor 54 to the traffic transfer module 52. The identifier could be inserted into one or more existing fields in a packet header, for example. Consider the example as shown in FIG. 2, where two traffic managers 30, 40 are operatively coupled to the output 58 of the controller 50. An internal protocol used to forward communication traffic between the traffic processor 54 and the traffic transfer module 52 may already include fields which are not normally used to control traffic forwarding between these components. Any such fields could be re-used to carry information to be used by the traffic transfer module 52 to identify the traffic manager 30, 40 that the traffic processor 54 has determined is to handle received communication traffic.

Using a binary identifier in a two-manager implementation, one bit might indicate the traffic manager 30 or the traffic manager 40, and other bits might indicate a particular one of the traffic queues 34, 44 of that traffic manager.

Any such identifier may be transformed by the traffic transfer module 52 or other components as received communication traffic is transferred toward its destination. In the above example of a binary manager/queue identifier, once the traffic transfer module 52 has determined the traffic manager 30, 40 to which communication traffic is to be transferred, the traffic manager indication bit may be dropped. Other transformations, to drop identifiers when they are no longer needed or to convert between protocols, for example, are also contemplated.

Although the traffic managers 30, 40 are shown in FIG. 2 as having the same structure, they need not necessarily function identically. For example, the traffic manager 30 may perform communication traffic management functions which include both interface-specific traffic management functions for the communication medium interfaces 22, 24 and generic or common traffic management functions for all of the communication medium interfaces 22, 24, 26, regardless of destination. The interface-specific traffic management functions for the interfaces 26 are performed by the traffic manager 40 in this example. According to one embodiment, generic functions performed by the traffic manager 30 are enabled using special queues of the traffic queues 34.

The concept of generic traffic management functions may be better illustrated by considering illustrative examples, port mirroring and multicasting.

Port mirroring involves replicating communication traffic destined for one port and sending a copy of the communication traffic on another port. When the traffic processor 54 determines that received communication traffic is destined for a port to be mirrored, which might be specified in a profile or other information associated with a port or destination, it replicates the communication traffic and inserts a different identifier into each copy of the communication traffic. One copy includes the identifier associated with the actual destination of the communication traffic, and that copy is transferred by the traffic transfer module 52 to the appropriate traffic manager 30, 40. The other copy includes an identifier of a special queue of the traffic queues 34 through which communication traffic re-enters the switch fabric 62, through an ingress data path (not shown), for example, and may be switched to the controller 50 or another component, depending on the destination to which the traffic is to be mirrored.

Multicasting may be handled in a substantially similar manner, although the controller 50 would normally handle multicasting to only the interfaces 22, 24, 26. If multicast traffic were to be sent to other components connected to the switch fabric 62, then replication for those other components would usually be handled by the switch fabric 62. A multicast queue of the traffic queues 34 may thus output copies of multicast communication traffic to the input 56 of the controller 50.

The traffic processor 54 may replicate multicast communication traffic in one pass, by making all required copies of the communication traffic and forwarding each copy to the traffic transfer module 52 when multicast communication traffic is received. This, however, may cause delays in communication traffic processing. According to a multiple-pass approach, the traffic processor 54 replicates multicast communication traffic once, and causes the traffic transfer module 52 to send one copy of the communication traffic to a traffic manager for one multicast destination and to a special queue of the traffic queues 34. The queued copy is then forwarded to the input 56 of the controller 50, and is again replicated for another multicast destination by the traffic processor 54, and so on until the communication traffic has been copied for all multicast destinations.

Figure 3:
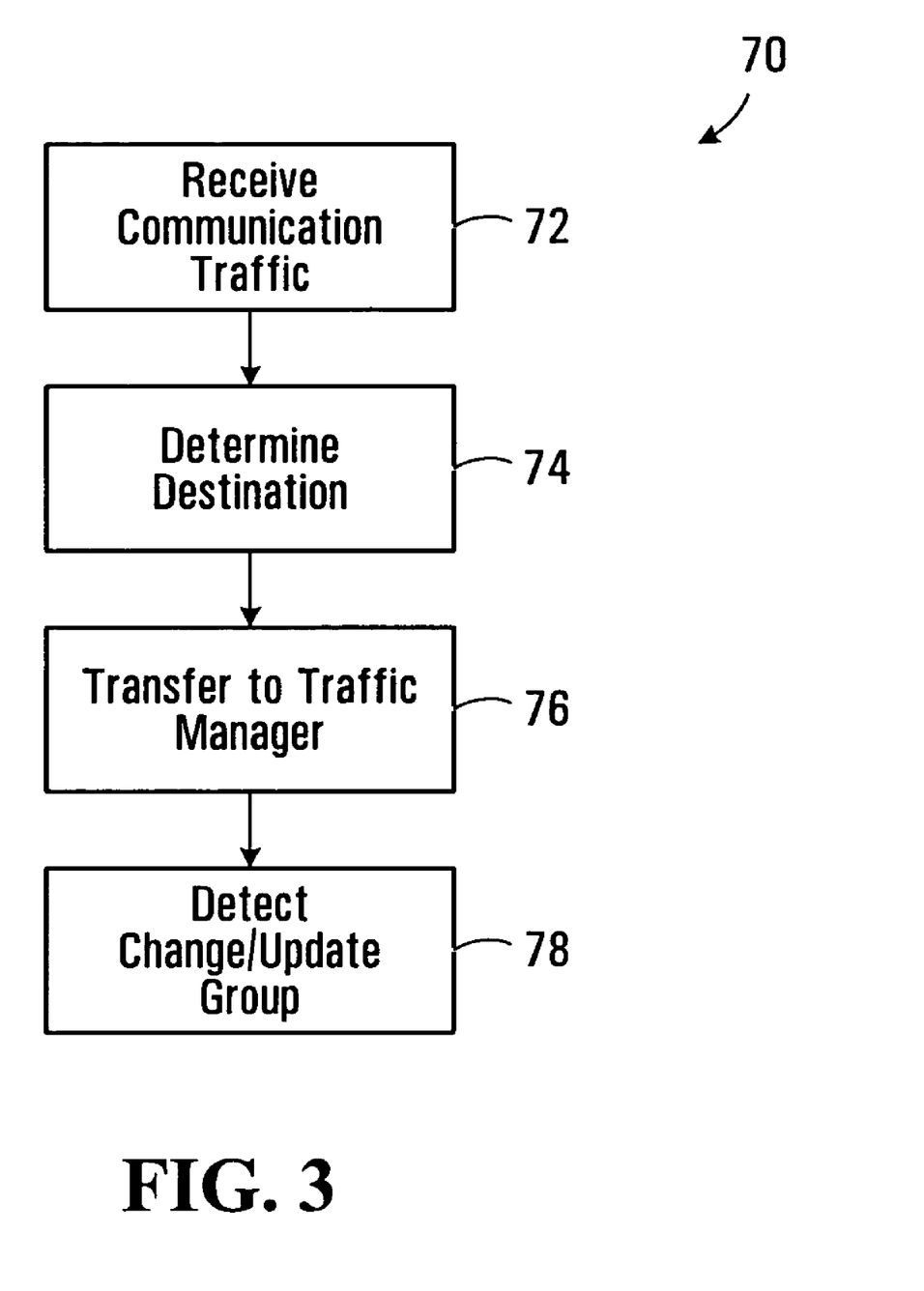
FIG. 3 is a flow diagram of a communication traffic management method.

Embodiments of the invention have been described above primarily in the context of communication equipment. FIG. 3 is a flow diagram of a communication traffic management method, according to another embodiment of the invention.

The method 70 begins at 72 with an operation of receiving communication traffic. A destination of the received communication traffic is determined at 74. At 76, the received communication traffic is transferred to a traffic manager for managing communication traffic to be sent toward the determined destination. The traffic manager is one of a group of one or more available traffic managers.

A change in the group of available traffic managers is detected at 78. This may involve detecting that an additional traffic manager has become available or that a traffic manager of the group has become unavailable, such as by detecting that a circuit card which includes a traffic manager has been connected to or disconnected from communication equipment. Replacement of one circuit card with an equivalent card may also be detected at 78.

Information associated with the group may also be updated at 78. Where each traffic manager includes traffic queues for storing communication traffic to be sent toward respective destinations, for example, a list of queues of available traffic managers may be maintained in a mapping table which is updated to reflect detected changes. An update operation need not necessarily be performed at 78 for every detected change, such as when one circuit card is replaced with an equivalent circuit card.

Subsequently received communication traffic is transferred to a traffic manager of the changed group by repeating the operations at 72, 74, 76.

Other embodiments of the invention may involve fewer, further, or different operations than shown in FIG. 3, and/or performing operations in a similar or different order than shown. Various manners of providing or performing the functions shown in FIG. 3, some of which may be apparent from the above description of FIG. 2, are also contemplated.

For example, in some embodiments, a component of communication equipment may be reconfigured at 78 responsive to detecting a change. This reconfiguration might be automatic, performed by a control card for example, or manually performed using an NMS or operator terminal. Once reconfigured, the component is operative to transfer subsequently received communication traffic to a traffic manager of the changed group.

As described in detail above, in accordance with an embodiment of the invention, an egress packet processing block may determine destinations of received packets and tag each packet accordingly, illustratively with an ID field in the packet's header. The ID field may then be used for determining to which traffic manager queuing element a packet should be sent.

If a packet is for an I/O card or other type of interface or output module for which communication traffic is handled by a basic traffic management and queuing function provided in a hardware core of communication equipment, then the packet is directed to that hardware. Otherwise, if the packet is for an optional "expansion" interface, it is directed to the appropriate distributed traffic management and queuing element.

As such, an "entry level" main traffic management and queuing element, with a fixed amount of queuing and fixed number of virtual output queues, can be designed without creating a bottleneck to growth of a system. Distributed queues in optional hardware, illustratively electronic circuit cards, can be used to increase buffering and virtual output queues outside of a main traffic management engine with growth of the system. Further, the main element can be used for common functions, to avoid providing these functions in the optional hardware. In this case, packet flows to distributed traffic management queues would also flow through the main queue.

Distributed queuing and traffic management has an additional advantage in terms of backpressuring. As those skilled in the art will appreciate, hardware backpressuring is generally faster than, and thus preferable to, software backpressuring. One problem with simply expanding the depth of memory provided at a central queuing point in communication equipment so as to increase the amount of buffering available for a set of communication ports is that there are limits on the number of hardware backpressure signals supported by current signalling protocols. Although additional storage could be used to increase the number of transmit queues available to store communication traffic to be sent through communication medium interfaces, not all of these queues would be backpressurable in hardware. Software backpressure could be applied to these queues, but may be too slow to avoid traffic loss, especially for high speed traffic.

According to embodiments of the invention, the traffic queues provided in the additional traffic managers are backpressurable queues. With reference to FIG. 2, the traffic queues 44 not only provide additional queue space, but also expand hardware backpressure capabilities since each set of queues 34, 44 has its own connection to a traffic management module and physical interfaces. Backpressuring can be separately applied to the queues 34 and the queues 44. In currently available systems, providing additional memory for the traffic queues 34 would allow more traffic to be queued, but hardware backpressuring capabilities would remain the same.

What has been described is merely illustrative of the application of principles of embodiments of the invention. Other arrangements and methods can be implemented by those skilled in the art without departing from the scope of the present invention.

For example, embodiments of the invention have been described above primarily with reference to an egress data path. However, it should be appreciated that the techniques disclosed herein are not restricted only to egress communication traffic which is exiting a communication network, and may be applied to other types of communication traffic, including ingress communication traffic being sent into a communication network.

In addition, although described primarily in the context of methods and systems, other implementations of the invention are also contemplated, as instructions stored on a machine-readable medium for example.

We claim:

1. A device comprising:
an output to be operatively coupled to a plurality of traffic managers, each traffic manager of the plurality of traffic managers for managing communication traffic to be sent toward one or more destinations; and
a controller, operatively coupled to the output, configured to determine a destination of received communication traffic,
wherein the controller is further configured to determine whether a common communication traffic management function performed by a predetermined traffic manager of the plurality of traffic managers is to be performed for the received communication traffic, to transfer the received communication traffic to a traffic manager of the plurality of traffic managers for managing communication traffic to be sent toward the determined destination where it is determined that the common communication traffic management function is not to be performed for the received communication traffic, and, where the common communication traffic management function is to be performed for the received communication traffic, to forward the received communication traffic to the predetermined traffic manager, the predetermined traffic manager being operatively coupled to the output and configured to perform the common communication traffic management function,
wherein each traffic manager of the plurality of traffic managers comprises a plurality of queues, each queue for storing communication traffic to be sent toward a respective destination,
wherein the controller is configured to determine a destination by accessing a list of queues of available traffic managers to thereby determine a queue of the plurality of queues for storing communication traffic to be sent toward the determined destination, to insert into the received communication traffic an identifier of the determined queue, and to transfer the received communication traffic to the determined queue.

2. The device of claim 1, wherein the communication traffic comprises blocks, each block having a header and an information portion, and wherein the controller is configured to determine the destination of the received communication traffic by accessing the header of each block of the received communication traffic.

3. The device of claim 1, wherein the plurality of queues comprises one or more hardware-backpressurable queues.

4. The device of claim 1, wherein the controller comprises a communication traffic processor configured to determine the destination of the communication traffic and to insert the identifier of the determined queue into the communication traffic, and a traffic transfer module operatively coupled to the traffic processor and to the output and configured to transfer the communication traffic to the determined queue.

5. The device of claim 1, wherein each traffic manager is configured to perform at least one traffic management function selected from the group consisting of: traffic scheduling and traffic shaping.

6. Communication equipment comprising the device of claim 1.

7. The communication equipment of claim 6, comprising the plurality of traffic managers operatively coupled to the output.

8. The communication equipment of claim 7, further comprising:
a plurality of ports for operative coupling to a communication medium, the plurality of queues being for storing communication traffic to be sent toward the respective destinations through one or more ports of the plurality of ports,
wherein the controller is configured to transfer the received communication traffic to a traffic manager by determining a port of the plurality of ports through which the traffic is to be sent and a queue of the plurality of queues for storing traffic for the determined port, and transferring the received communication traffic to the determined queue.

9. The communication equipment of claim 8, wherein the plurality of ports comprises ports provided on a plurality of electronic circuit cards, the plurality of electronic circuit cards comprising the plurality of traffic managers.

10. The communication equipment of claim 6, further comprising a traffic manager and an electronic circuit card comprising an additional traffic manager of the plurality of traffic managers, the traffic manager of the electronic circuit card being operable to receive communication traffic from the controller of the communication equipment when the electronic circuit card is operatively coupled to the communication equipment.

11. A method comprising:
   receiving communication traffic;
   determining a destination of the received communication traffic;
   determining whether a common communication traffic management function is to be performed for the received communication traffic;
   transferring the received communication traffic to a traffic manager for managing communication traffic to be sent toward the determined destination where it is determined that the common communication traffic management function is not to be performed for the received communication traffic, the traffic manager being one of a plurality of traffic managers; and
   transferring the received communication traffic to a predetermined traffic manager of the plurality of traffic managers that performs the common communication traffic management function where it is determined that the common communication traffic management function is to be performed for the received communication traffic,
   wherein each traffic manager of the plurality of traffic managers comprises a plurality of queues, each queue for storing communication traffic to be sent toward a respective destination, the method further comprising:
   maintaining a list of queues of available traffic managers,
   wherein determining a destination comprises accessing the list to determine a queue of the plurality of queues for storing communication traffic to be sent toward the determined destination,
   wherein the operations of transferring comprise transferring communication traffic to the determined queue, wherein determining a destination further comprises inserting into the received communication traffic an identifier of the determined queue.

12. The method of claim 11, further comprising:
   detecting a change in the plurality of traffic managers; and
   transferring subsequently received communication traffic to a traffic manager of the changed plurality of traffic managers,
   wherein detecting comprises at least one of: detecting that an additional traffic manager has become available and detecting that a traffic manager of the plurality of traffic managers has become unavailable.

13. The method of claim 11, implemented in communication equipment adapted for operation with electronic circuit cards, further comprising:
   detecting a change in the plurality of traffic managers; and
   transferring subsequently received communication traffic to a traffic manager of the changed plurality of traffic managers,
   wherein detecting comprises at least one of: detecting that an electronic circuit card comprising a traffic manager has been connected to the communication equipment and detecting that an electronic circuit card comprising a traffic manager has been disconnected from the communication equipment.

14. The method of claim 10, implemented in communication equipment, the method further comprising:
   detecting a change in the plurality of traffic managers;
   transferring subsequently received communication traffic to a traffic manager of the changed plurality of traffic managers; and
   reconfiguring a component of the communication equipment responsive to the detecting, the component being reconfigured to transfer subsequently received communication traffic to a traffic manager of the changed plurality of traffic managers.

\* \* \* \* \*

UNITED STATES PATENT AND TRADEMARK OFFICE
CERTIFICATE OF CORRECTION

PATENT NO. : 7,609,707 B2  Page 1 of 1
APPLICATION NO. : 11/216913
DATED : October 27, 2009
INVENTOR(S) : Pike et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Twelfth Day of October, 2010

David J. Kappos
*Director of the United States Patent and Trademark Office*